(12) United States Patent
Gliga et al.

(10) Patent No.: US 12,217,774 B2
(45) Date of Patent: Feb. 4, 2025

(54) METHOD FOR SPEED-UP OF MAGNETIC SIGNAL READOUT FROM MAGNETIC STORAGE MEDIA BY BEAM SPLITTING

(71) Applicant: Paul Scherrer Institut, Villigen PSI (CH)

(72) Inventors: Sebastian Gliga, Zürich (CH); Jörg Raabe, Villnachern (CH)

(73) Assignee: Paul Scherrer Institut, Villigen PSI (CH)

( * ) Notice: Subject to any disclaimer, the term of this patent is extended or adjusted under 35 U.S.C. 154(b) by 0 days.

(21) Appl. No.: 18/549,015

(22) PCT Filed: Feb. 28, 2022

(86) PCT No.: PCT/EP2022/054988
§ 371 (c)(1),
(2) Date: Sep. 5, 2023

(87) PCT Pub. No.: WO2022/184642
PCT Pub. Date: Sep. 9, 2022

(65) Prior Publication Data
US 2024/0105215 A1    Mar. 28, 2024

(30) Foreign Application Priority Data
Mar. 5, 2021 (EP) .................... 21161010

(51) Int. Cl.
*G11B 5/008* (2006.01)
*G11B 11/105* (2006.01)

(52) U.S. Cl.
CPC .... *G11B 5/00813* (2013.01); *G11B 11/10545* (2013.01)

(58) Field of Classification Search
None
See application file for complete search history.

(56) References Cited

U.S. PATENT DOCUMENTS

| | | | |
|---|---|---|---|
| 2024/0030675 A1* | 1/2024 | Fuchs | H01S 4/00 |
| 2024/0105215 A1* | 3/2024 | Gliga | G11B 11/10545 |

FOREIGN PATENT DOCUMENTS

| | | | | |
|---|---|---|---|---|
| EP | 446021 A   * | 9/1991 | ....... | G11B 11/10545 |
| EP | 2853886 A1 * | 4/2015 | ............. | G01N 23/04 |

(Continued)

OTHER PUBLICATIONS

Stöhr J. et al, "Element-Specific Magnetic Microscopy with Circularly Polarized X-rays", US vol. 259, No. 5095, DOI: 10.1126/science.259.5095.658, ISSN:0036-8075, Jan. 29, 1993 (Jan. 29, 1993), p. 658-661, Science, Retrieved from the Internet: URL:https://science.sciencemag.org/content/259/5095/658.full.pdf, XP055827884, the whole document.

(Continued)

*Primary Examiner* — William J Klimowicz
(74) *Attorney, Agent, or Firm* — Laurence A. Greenberg; Werner H. Stemer; Ralph E. Locher

(57) ABSTRACT

A method for increasing readout speed of information encoded on magnetic storage media uses contactless circularly polarized X-rays, allowing real-time, high-fidelity readout. Magnetic information is encoded by magnetization value and direction stored on magnetic tapes or disk drives. The method includes providing first c+ and second c− circularly polarized X-ray beams, orienting the first and second X-ray beams towards the magnetic tape, simultaneously reading out the first and second X-ray beams after passage through the same region of the magnetic tape while advancing the magnetic tape, and determining magnetic information by the difference between two readout signals from the first and second x-ray beams based on X-ray magnetic circular dichroism. Based on beam splitting, real-time readout of the magnetic signal stored on the magnetic (Continued)

tape is achievable by intensity signal evaluation for the first and second X-ray beams.

11 Claims, 3 Drawing Sheets

(56) References Cited

FOREIGN PATENT DOCUMENTS

| | | | | |
|---|---|---|---|---|
| EP | 4053839 A1 | * | 9/2022 | ....... G11B 11/10545 |
| JP | H0545304 A | * | 2/1993 | |
| JP | 2010277671 A | * | 12/2010 | |
| JP | 2012251797 A | | 12/2012 | |

OTHER PUBLICATIONS

Van Der Laan G, "Applications of soft x-ray magnetic dichroism", Journal of Physics: Conference Series, Institute of Physics Publishing, Bristol, GB, vol. 430, No. 1, Apr. 22, 2013 (Apr. 22, 2013), p. 12127, XP020240628, DOI: 10.1088/1742-6596/430/1/012127, ISSN:1742-6596, Section 5. Spintronics applications, Second paragraph.;p. 7.

* cited by examiner

METHOD FOR SPEED-UP OF MAGNETIC SIGNAL READOUT FROM MAGNETIC STORAGE MEDIA BY BEAM SPLITTING

FIELD AND BACKGROUND OF THE INVENTION

The present invention is related to speeding up the readout of magnetic storage media by circularly polarized X-rays.

The terms magnetic storage media and magnetic recording media are used interchangeably and refer to media where information is stored magnetically. This invention relates to magnetic recording media in general but is discussed here in terms of magnetic recording tape. 'Magnetic recording tape' applies to tapes for the storage of different kinds of information, such as audio or video signals and binary data, as well as to other forms of magnetic recording media such as disks.

The readout of magnetic tapes using circularly polarized X-rays allows recovering the stored magnetic information in deteriorated magnetic tapes due to heavy chemical degradation (stickiness, excessive shed, flaking) that typically prevents the use of the tapes in equipment for recording or playback. Indeed, the tapes may stick and shed onto player guides and heads or are too brittle to be played. Practically, the tape can in most cases be unwound, and the magnetic pattern is mostly intact, but can only be read using a contactless technique. Circularly polarized X-rays can provide such a possibility. The readout of magnetic tapes using circularly polarized X-rays also allows reading out the magnetic information off magnetic tapes for which playback equipment is not available anymore due to technological obsolescence. It is understood that the magnetic information is encoded by the magnetization value and direction stored on the magnetic tapes.

Presently, millions of tapes are in possession of music labels, academic or cultural institutions, or in private hands, and consist of unique recordings that could become irrecoverable due to degradation or technological obsolescence. In this context, their recovery using circularly polarized X-rays might be the 'last chance' because the X-rays provide contactless readout, avoiding damage to fragile tape. The readout using an X-ray beam is also flexible, in the sense that, in principle, any track configuration can be readout by steering the photon beam. However, the readout of the magnetic information is slower than that of original playback equipment. A principal bottleneck is that, to determine the magnetic signal, the X-ray polarization is alternated in time between right- and left-handed circular polarizations, denoted as c+ and c−. This typically takes between a few seconds and a few minutes, depending on the setup, thus hindering fast readout. Indeed, audio recordings have speeds ranging between 2.4 cm/s and 76.2 cm/s. Consequently, assuming readout by the X-ray beam at closely spaced intervals along the tape (e.g. every few micrometers of tape) to ensure high-fidelity, switching the polarization in time does not allow real-time readout.

Over the past decades, a number of attempts have been made to retrieve data from magnetic media, such as music and data tapes, using contactless magnetic contrast imaging. Domain patterns on a magnetic tape can be visualized by using ferrous oxide particles in solution placed above the tape. However, this technique does not allow recovering the totality of the magnetic information due to its low spatial resolution and to the fact that the sign of the magnetic field cannot be determined. More recent attempts at recovering the information stored on magnetic tape media include using e.g. magnetoresistive sensors developed for hard disk drives to scan magnetic tapes as well as scanning SQUID microscopy. While these techniques enable measuring the sign of the magnetic fields and analog waveforms can be recovered, they are slow, have a limited field of view and only realistically allow inspecting very small portions of tape, of the order of a few millimeters. Another possibility consists in using a magneto-optic garnet film in very close proximity of the sample to detect the stray fields along the tape. However, it remains impractical for heavily damaged tapes whose magnetic fields might be particularly complex, making it difficult to reconstruct the original information with high fidelity. In addition, the garnet film needs to be placed very close to the tape surface (ca. 5 micrometers), which excludes the possibility of reading sections of degraded tapes that are not flat. Optical defects in the garnet film can equally complicate data recovery.

SUMMARY OF THE INVENTION

It is therefore the objective of the present invention to provide a method to speed up the readout of magnetic storage media using circularly polarized X-rays. Also, the present invention allows achieving a low signal-to-noise ratio of the readout signal, enabling the readout of magnetic information with high fidelity.

Fast readout is achieved according to the present invention by the provision of two circularly polarized x-ray beams, e.g. by (1) spatially splitting an incoming linearly-polarized X-ray beam and circularly polarizing each resulting beam or by (2) allowing an electron beam to pass through two undulators, creating two circularly-polarized X-ray beams. When using two undulators, the X-ray beam paths can be separated using a chicane or by adjusting the electron beam trajectory. Both (1) and (2) eliminate the delay inherent to changing the light polarization in time. Therefore, the method for speeding up the contactless readout of the magnetic information stored on magnetic tapes, said magnetic information being encoded by the magnetization value and direction stored on the magnetic tapes, comprises the steps of:

a) providing a first circularly polarized x-ray beam c+ and a second circularly polarized x-ray beam c−;
b) orienting the first circularly polarized X-ray beam c+ and the second circularly polarized X-ray beam c− towards the magnetic tape;
c) reading out the first circularly polarized X-ray beam c+ and the second circularly polarized X-ray beam c− after their passage through the same region of the magnetic tape while advancing the magnetic tape, and
d) determining the magnetic information by the difference between the two readout signals from the first circularly polarized x-ray beam c+ and the second circularly polarized X-ray beam c− based on X-ray magnetic circular dichroism.

Based on this scheme of two circularly polarized X-ray beams, e.g. according to the beam splitting scheme or the undulator scheme, a real-time readout of the magnetic signal stored on the tape can be achieved by evaluating the signal intensity for the c+X-ray beam and for the c− X-ray beams passing through the same region of the magnetic tape based on X-ray magnetic circular dichroism. An additional advantage of the two-beam scheme, e.g. the beam splitting or the two undulators scheme, is an improved signal-to-noise ratio by eliminating upstream sources of noise. This results in shorter integration times during signal readout. An additional advantage of the disclosed method is that while the advancing speed of the magnetic tape can match that of a magnetic tape player and allow real-time readout, the readout speed can be varied as required by the state of the magnetic tape.

According to a preferred embodiment of the present invention for the provision of the two circularly polarized x-ray beams (c+) and (c−), an X-ray source for generating a linearly polarized x-ray beam is provided. The generated linearly polarized X-ray beam is split into a first linearly polarized X-ray beam and a second linearly polarized X-ray beam. The first linearly polarized X-ray beam and the second linearly polarized X-ray beam are then converted into the first circularly polarized beam (c+) and the second circularly polarized beam (c−).

Another preferred embodiment of the present invention involves the creation of two circularly polarized x-ray beams: c+ and c−. A particle beam, in particular an electron or positron beam, is provided which passes along a first undulator to generate the first circularly polarized X-ray beam and along a second undulator to generate the second circularly polarized X-ray beam. In the first preferred embodiment, the electron beam is used to produce a linearly polarized X-ray beam which is then split and circularly polarized, thus enabling the operator to focus the two circularly polarized X-ray beams onto the same region of the magnetic tape and readout subsequently. In the second preferred embodiment, the electron beam is used with the help of two undulators to directly produce two circularly polarized X-ray beams enabling the operator to focus each beam on the same region of the tape and read it out accordingly.

In a preferred embodiment of the present invention, the beam spots can be in the range of 0.1 to 10 microns, preferably corresponding to the recording or playback head gap, in the vertical direction and 5 to 500 microns in the horizontal direction. In the horizontal direction, the values correspond to a beam sufficiently wide to achieve a reasonable signal-to-noise ratio along the audio or data track width. These values can be adjusted as needed using slits to shape the beams. By adjusting the position of the two beams, it is possible to readout different track configurations of the magnetic tape thereby realizing a "virtual readout tape head".

Suitable characteristics of the x-ray beam can be achieved when the beam energy is in the range from 5 to 10 keV. The main requirement is that the beam energy is tuned to an appropriate material absorption edge to use the XMCD effect. Hence, the energy range is broad. Therefore, the beam energy has to be tuned to an appropriate absorption edge. Further, the beam intensity may range from $10^{10}$ to $10^{13}$ photons/second.

A suitable readout sample rate with sufficient speed can be achieved, when the readout sample rate is in the range from 20 kHz to 200 kHz, preferably around 100 KHz.

A further preferred embodiment of the present invention provides for an algorithm to identify the magnitude and the direction of the magnetic state encoded on the tape which uses the signal of two detectors; the first detector detects the signal from the c+X-ray beam and the second detector detects the signal from the c− X-ray beam wherein the magnetic information is determined from the two detected signals c+ and c− Thus, the magnetic signal can be obtained by the division c−/c+, but it can also be obtained with appropriate normalization through a more complicated formula:

$$(c++c-)/(c+-c-).$$

Preferred embodiments of the present invention are hereinafter discussed in more detail with reference to the attached drawings.

DETAILED DESCRIPTION OF THE INVENTION

Figure 1:
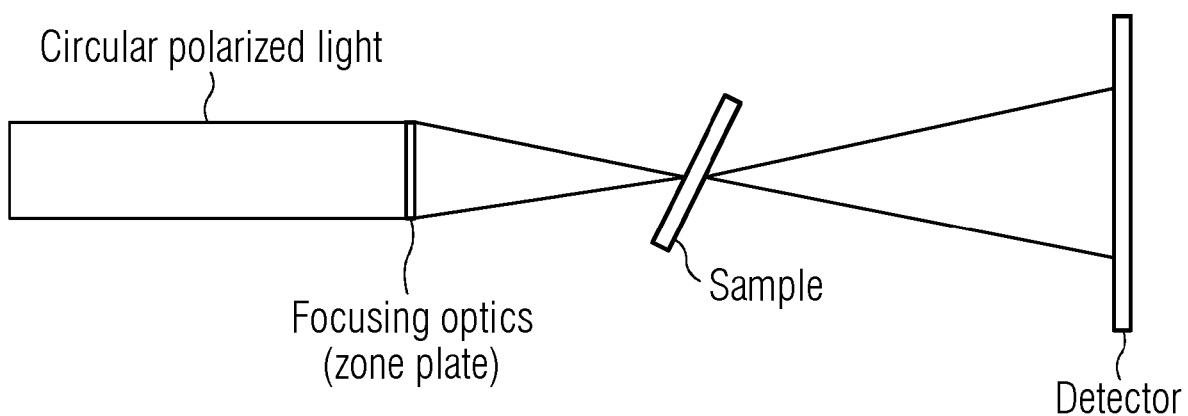
FIG. 1 schematically a typical magnetic measurement setup using circularly polarized X-rays to measure magnetic states according to the prior art.

The present invention can be realized by a first setup 2 to mount a magnetic tape 4 and to use circularly polarized hard X-rays in transmission to readout the signal from magnetic music or data tapes 4 (tape spools not illustrated here). An X-ray source 6 generates a linearly polarized x-ray beam 8 that is directed through focusing optics 10, such as a zone plate, and beam splitter gratings 12a, 12b to split the x-ray beam into two x-ray beams 8a, 8b.

Then, the two x-ray beams 8a and 8b go each through recombiner gratings 14a, 14b, and are converted into two circularly polarized beams c+, c− using circular polarizers. The two circularly polarized beams c+, c− are needed to readout the magnetic state of the magnetic tape 4. The circularly polarized light can be also obtained by using two undulators.

Figure 2:
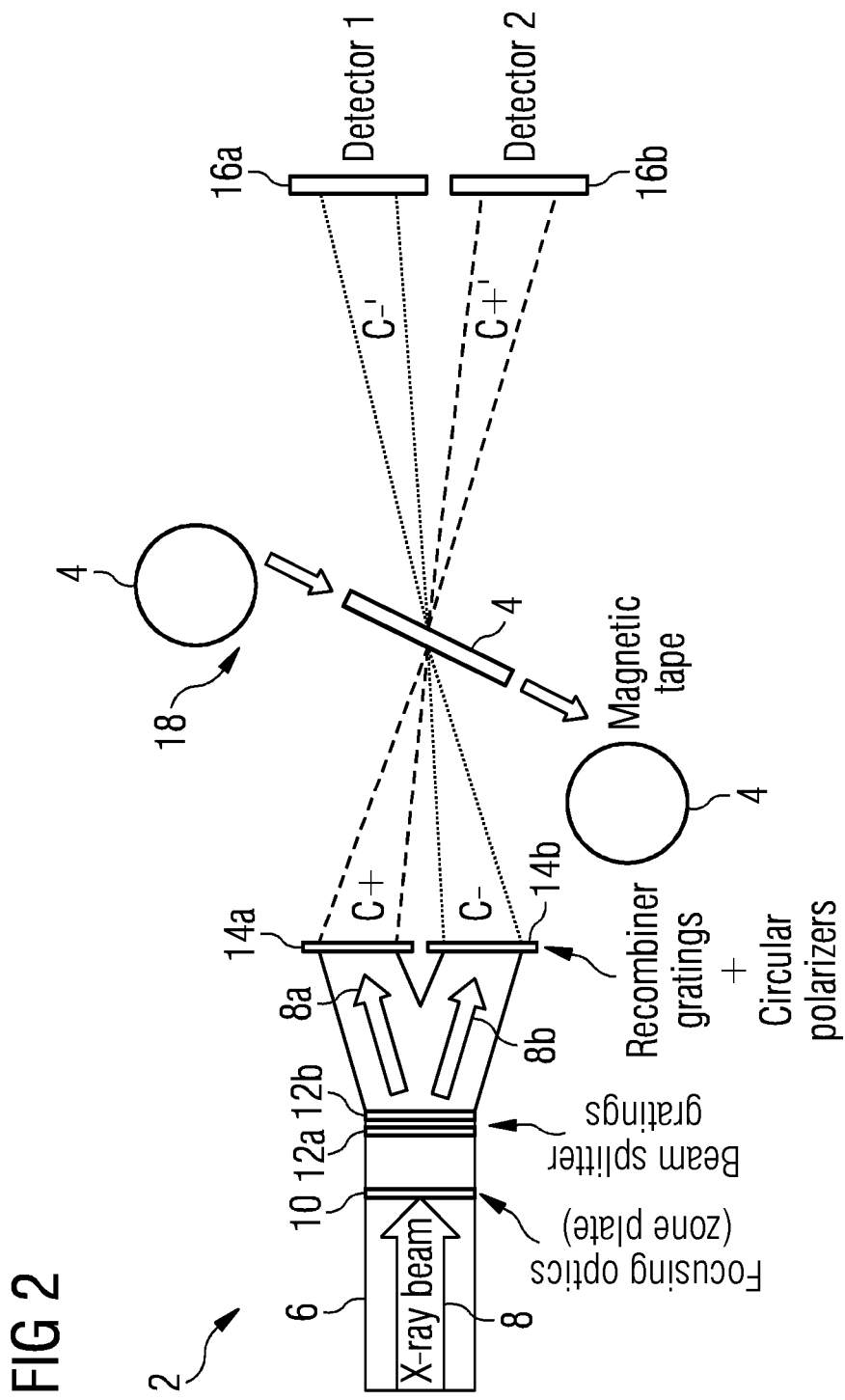
FIG. 2 schematically a first setup to use circularly polarized hard X-rays in transmission to readout the magnetic signal from a magnetic tape.

The first setup 2 is schematically illustrated in FIG. 2. It differs from typical magnetic measurement setups (illustrated in FIG. 1), where circularly polarized X-rays are used to measure magnetic states. The polarization is normally changed sequentially, which takes time. In the present setup, the X-ray beam 8 is split into two beams (circularly polarized c+ and c−), allowing significantly faster readout of the magnetic state. Two detectors 16a, 16b are used to readout the signals from the c+ and c− X-ray beams. The magnetic tape 4 can therefore be mounted on a custom-made tape machine 18 allowing the two X-ray beams c+, c− to go through the same region of the magnetic tape 4 leading to attenuated x-ray beams c+' and c−'. With the measured region of the magnetic tape 4, the polarized X-ray absorption differs for the c+ and c− beams, depending on the magnetic state (encoding the stored information) of this particular region of the magnetic tape 4. Hence, the c+' and c−' beams differ from c+ and c− beams in terms of their intensities. Based on this beam splitting scheme, real-time readout of the magnetic signal stored on the magnetic tape 4 can be achieved. This practically means that for example a 1-hour long music tape will take 1 hour to readout. To advance the magnetic tape 4, a mechanical drive mechanism similar to those of a standard magnetic tape machine can be used.

In this setup 2, the x-ray beam 8 has a beam energy of 7.127 keV and a wavelength of 1.74 Angstrom. In this example, the beam energy of 7.127 keV corresponds to the absorption edge of gamma ferric oxide (γ-Fe2O3), where the magnetic contrast is maximal. Ferric oxide was commonly used as magnetic medium in audio tapes. Absorption characteristics of the magnetic material used therefore can be a further relevant criterion for the adjustment of the energy of the x-ray beam 8.

The algorithm that is used to identify the magnitude and the direction of the magnetic field on the magnetic tape 4 can be straightforward. In the proposed experimental setup 2, the x-ray beam 8 is split into two circularly polarized beams c+, c− and the two detectors 16a, 16b measure the magnetic signal in terms of the changed beam intensity due to the magnetization of the specific spot of the magnetic tape 4 the two circularly polarized x-ray beams c+ and c− pass the same time. The detector 16a detects the intensity $I_{c-'}$ of the modified beam c−' and the other detector 16b measures the intensity $I_{c+'}$ of the modified beam c+'. The magnetic information on the tape (magnetic contrast), can be obtained from the two detected quantities: $I_{c-'}$ and $I_{c+'}$.

The beam spot on the magnetic tape has been established to be in the range of 0.1 to a few microns, preferably the size of the recording or playback head gap, in the vertical direction and around 500 microns in the horizontal direction. These values correspond approximately to the resolution of a standard magnetic read head (in the vertical direction) and to a sizeable portion of the audio track size (in the horizontal direction) on the magnetic tape 4. These values can be adjusted as needed using slits to shape the beams.

Figure 3:
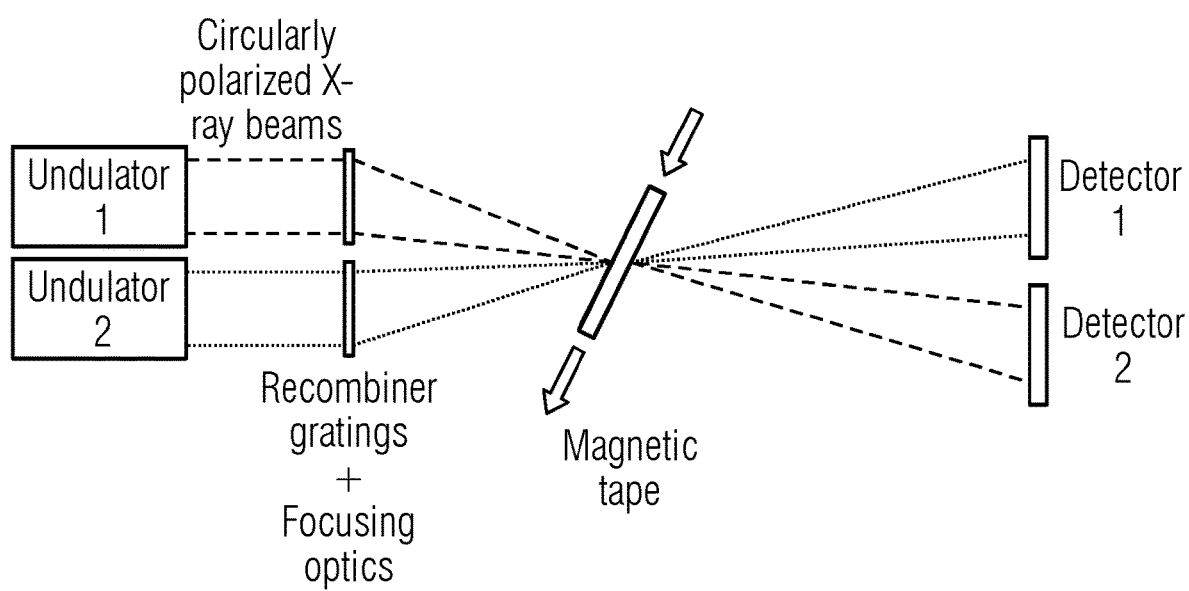
FIG. 3 schematically a second setup to use circularly polarized hard X-rays in transmission to readout the magnetic signal from a magnetic tape.

FIG. 3 schematically shows a second setup for the generation of the circularly polarized x-ray beams. Presently, a particle beam, typically an electron beam, passes along a first undulator and a second undulator. Each undulator generates a circularly polarized x-ray beam which is then directed towards and through the same spot of the magnetic tape, which is advanced, for example driven by a mechanical drive similar to those found in standard magnetic tape machine. The remaining parts of the second setup are equal to the components and conditions used for the first setup.

The invention claimed is:

1. A method for speeding up contactless readout of magnetic information stored on magnetic tapes, the magnetic information being encoded by a magnetization value and direction stored on the magnetic tapes, the method comprising steps of:
    a) providing a first circularly polarized x-ray beam and a second circularly polarized x-ray beam;
    b) orienting the first circularly polarized X-ray beam and the second circularly polarized X-ray beam towards a magnetic tape;
    c) simultaneously reading out the first circularly polarized X-ray beam and the second circularly polarized X-ray beam after their passage through the same region of the magnetic tape while advancing the magnetic tape; and
    d) determining the magnetic information by a difference between two respective readout signals from the first x-ray beam and the second x-ray beam based on X-ray magnetic circular dichroism.

2. The method according to claim 1, which further comprises carrying out the step of providing the first and second circularly polarized x-ray beams and by:
    using an X-ray source to generate a linearly polarized x-ray beam;
    splitting the linearly polarized X-ray beam into a first linearly polarized X-ray beam and a second linearly polarized X-ray beam; and
    converting the first linearly polarized X-ray beam and the second linearly polarized X-ray beam into the first circularly polarized beam and the second circularly polarized beam.

3. The method according to claim 1, which further comprises carrying out the step of providing the first and second circularly polarized x-ray beams by passing a particle beam along a first undulator to generate the first circularly polarized X-ray beam, and passing a particle beam along a second undulator to generate the second circularly polarized X-ray beam.

4. The method according to claim 3, which further comprises providing electron beams as the particle beams.

5. The method according to claim 1, which further comprises providing beam spots of the first x-ray beam and the second x-ray beam in a range of 0.1 to 10 microns when passing through the magnetic tape in a vertical direction and 5 to 500 microns in a horizontal direction, corresponding approximately to a sizeable amount of an audio track size of the magnetic information stored on the magnetic tape in the horizontal direction and to a resolution of a magnetic read head in the vertical direction.

6. The method according to claim 5, which further comprises providing the range to correspond to a recording or playback head gap.

7. The method according to claim 1, which further comprises providing the x-ray beams with a beam energy in a range of from 5 to 10 keV.

8. The method according to claim 1, which further comprises providing the first x-ray beam and the second x-ray beam with a beam intensity ranging from $10^{10}$ to $10^{13}$ photons/second.

9. The method according to claim 1, which further comprises setting a readout sample rate in a range of from 20 KHz to 200 KHz.

10. The method according to claim 9, which further comprises setting the readout sample rate at around 100 KHz.

11. The method according to a claim 1, which further comprises:
    using signals of first and second detectors for an algorithm to identify the magnitude and the direction of the magnetic information in a form of the stored magnetic information being encoded by the magnetization value and direction on the magnetic tapes;
    using the first detector to detect the signal from the first X-ray beam and using the second detector to detect the signal from the second X-ray beam; and
    calculating the magnetic information on the magnetic tape from the signals.

* * * * *